US008550897B2

(12) United States Patent
Hornik et al.

(10) Patent No.: US 8,550,897 B2
(45) Date of Patent: Oct. 8, 2013

(54) WAGERING GAMES WITH BONUS GAME ACCRUAL THROUGH MULTIPLE PLAYS OF A BASIC GAME

(75) Inventors: Jeremy M. Hornik, Chicago, IL (US); Pamela S. Smith, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 166 days.

(21) Appl. No.: 13/152,575

(22) Filed: Jun. 3, 2011

(65) Prior Publication Data

US 2012/0015707 A1 Jan. 19, 2012

Related U.S. Application Data

(60) Provisional application No. 61/365,136, filed on Jul. 16, 2010.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .............................................. 463/20; 463/21

(58) Field of Classification Search
USPC ..................................................... 463/20, 21
See application file for complete search history.

(56) References Cited

U.S. PATENT DOCUMENTS 5,632,485 A 5/1997 Woodland et al.
5,720,662 A 2/1998 Holmes, Jr. et al.
7,322,887 B2 1/2008 Belger et al.
7,470,186 B2 12/2008 Cannon
7,618,319 B2 11/2009 Casey et al.
7,993,195 B2 8/2011 Belger et al.
2002/0151346 A1* 10/2002 Devaull .......................... 463/20
2002/0151349 A1 10/2002 Joshi
2004/0242316 A1 12/2004 Oles et al.
2005/0055113 A1 3/2005 Gauselmann
2006/0084486 A1 4/2006 Belger et al.
2009/0117990 A1 5/2009 Englman et al.

(Continued)

FOREIGN PATENT DOCUMENTS

WO 97/19736 A1 6/1997
WO 2009/005657 A1 1/2009
WO 2009/114472 A1 9/2009

OTHER PUBLICATIONS

Third Party Submission in published application No. US2012-0015707, dated Mar. 19, 2012, (3 pages).

*Primary Examiner* — Michael Cuff
*Assistant Examiner* — Kevin Y Kim
(74) *Attorney, Agent, or Firm* — Nixon Peabody LLP

(57) ABSTRACT

Gaming devices, gaming systems, methods of conducting a wagering game, and computer programs for initiating a wagering game are presented herein. One concept of the present disclosure is directed to earning bonus features through play of multiple games in series or in parallel. A wagering game includes a base game and a bonus game. A number of base games are conducted in series or in parallel. For each of the conducted base games, one or more bonus-game-modifiers are added to a feature pool (e.g., a queue) in response to a predetermined event (e.g., a winning outcome) occurring in that base game. In response to a triggering event (e.g., filling the feature pool, a symbol-based trigger in the current base game, etc.), the bonus game is conducted as modified by the bonus-game-modifiers in the feature pool.

27 Claims, 12 Drawing Sheets

(56) References Cited

U.S. PATENT DOCUMENTS

2009/0203436 A1 8/2009 Yoshizawa
2009/0253492 A1 * 10/2009 Caputo et al. .................. 463/20
2010/0016063 A1 1/2010 Jaffe et al.
2010/0016071 A1 * 1/2010 Jaffe et al. ....................... 463/27
2010/0056251 A1 3/2010 Jaffe et al.
2011/0045892 A1 2/2011 Vann et al.

* cited by examiner

WAGERING GAMES WITH BONUS GAME ACCRUAL THROUGH MULTIPLE PLAYS OF A BASIC GAME

CROSS-REFERENCE AND CLAIM OF PRIORITY TO RELATED APPLICATION

This application claims the benefit of and priority to U.S. Provisional Patent Application No. 61/365,136, filed Jul. 16, 2010, which is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present disclosure relates generally to gaming devices, wagering game systems, and methods for playing wagering games. More particularly, the present disclosure relates to wagering games with a base game and a bonus game, the base game including features that affect play of the bonus game.

BACKGROUND

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators strive to employ the most entertaining and exciting machines, features, and enhancements available because such machines attract frequent and continuous play and hence increase profitability to the operator.

One concept that has been successfully employed to enhance the entertainment value of a game is the concept of a "secondary" or "bonus" game that may be played in conjunction with a "primary" or "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Wagering games may additionally award players with "progressive jackpot" awards that are funded, at least in part, by a percentage of coin-in from the gaming machine or a plurality of participating gaming machines.

While some current game features provide some enhanced excitement, there is a continuing need to develop new features for wagering games to satisfy the demands of players and operators. Such new features for wagering games will further enhance player excitement, perpetuate player loyalty, and thus increase game play and profitability.

SUMMARY

According to one aspect of the present disclosure, a computer-implemented method for conducting a wagering game in a gaming system is featured. The wagering game includes a base game and a bonus game. The gaming system includes one or more processors for conducting the wagering game, and at least one display device for displaying the wagering game. The method includes: conducting a plurality of base games; for each of the conducted base games, adding at least one random bonus-game-modifier to a feature pool in response to a predetermined event in the respective base game; and, in response to a triggering event, conducting the bonus game modified by the random bonus-game-modifiers in the feature pool.

According to another aspect of the disclosure, a gaming system is presented for conducting a wagering game, which includes a base game and a bonus game. The gaming system includes one or more processors and at least one display device configured to display the wagering game. The one or more processors are configured to: conduct a plurality of base games; for each of the conducted base games, add at least one random bonus-game-modifier to a feature pool in response to a predetermined event in the respective base game; and, in response to a triggering event, conduct the bonus game modified by the random bonus-game-modifiers in the feature pool.

According to yet another aspect of the disclosure, one or more machine-readable storage media are featured. The one or more machine-readable storage media include instructions that, when executed by one or more processors, cause the processors to perform operations associated with a wagering game, which includes a base game and a bonus game. The operations include: conducting a plurality of base games; for each of the conducted base games, adding at least one random bonus-game-modifier to a feature pool in response to a predetermined event in the respective base game; and, in response to a triggering event, conducting the bonus game modified by the random bonus-game-modifiers in the feature pool.

The above summary of the disclosure is not intended to represent each embodiment or every aspect of the present invention. Rather, the summary merely provides an exemplification of some of the novel features included herein. The above features and advantages, and other features and advantages of the present invention, will be readily apparent from the following detailed description of the embodiments and best modes for carrying out the present invention when taken in connection with the accompanying drawings and appended claims.

Figure 1A:
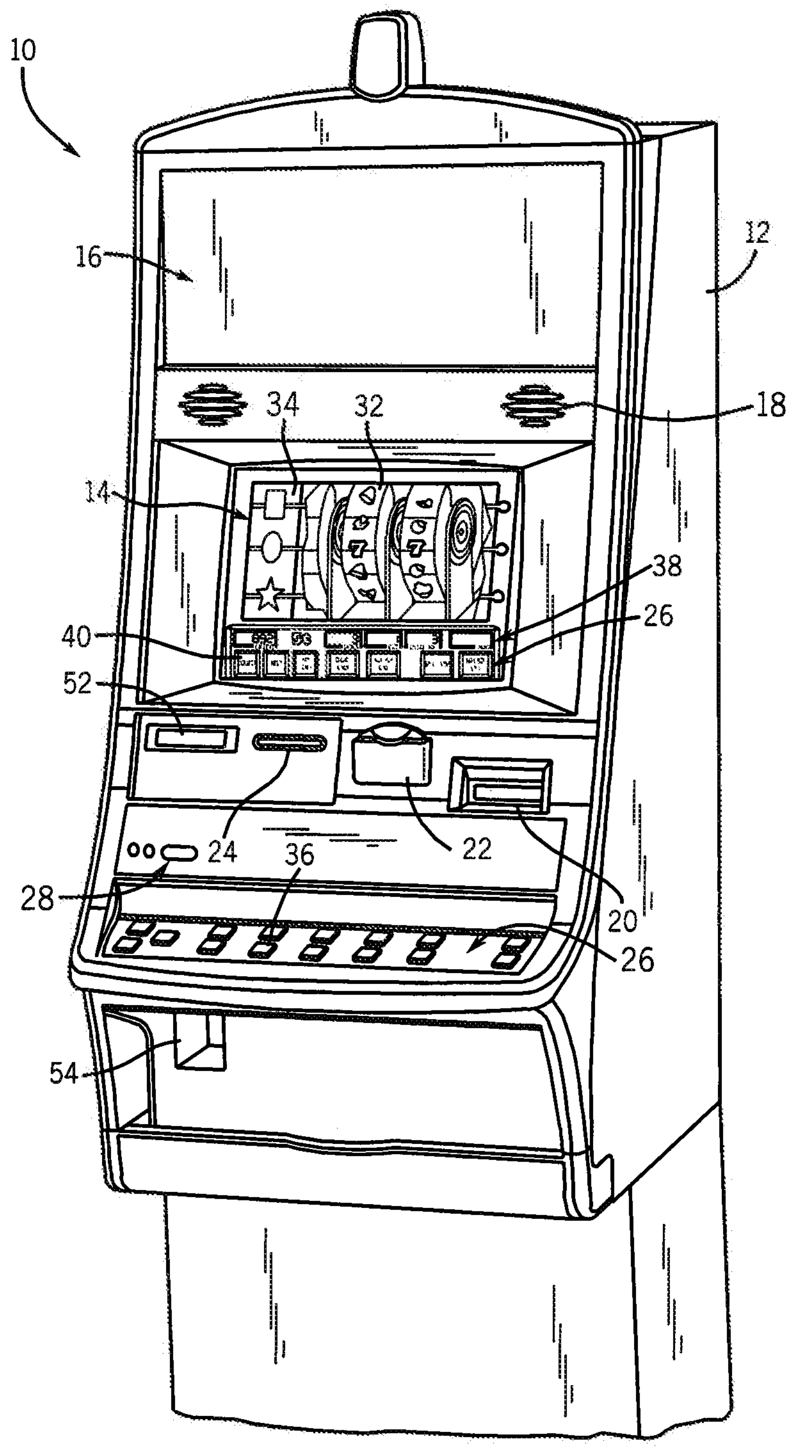
FIG. 1A is a perspective-view illustration of an exemplary free-standing gaming terminal according to an embodiment of the present disclosure.

While the invention is susceptible to various modifications and alternative forms, specific embodiments have been shown by way of example in the drawings and will be described in detail below. It should be understood, however, that the invention is not intended to be limited to the particular forms disclosed. Rather, the invention is to cover all modifications, equivalents, and alternatives falling within the spirit and scope of the invention as defined by the appended claims

DETAILED DESCRIPTION

While this invention is susceptible of embodiment in many different forms, there is shown in the drawings and will herein be described in detail representative embodiments of the disclosure with the understanding that the present disclosure is to be considered as an exemplification of the various aspects and principles of the invention, and is not intended to limit the broad aspect of the invention to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise.

Referring to FIG. 1A, a perspective-view illustration of an exemplary gaming terminal 10 (also referred to herein as "wagering game machine" or "gaming machine") is shown in accordance with one embodiment of the present disclosure. The gaming terminal 10 of FIG. 1 may be used, for example, in traditional gaming establishments, such as casinos, and non-traditional gaming establishments, such as pools, hotels, restaurants, and airports. With regard to the present disclosure, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, a mobile telecommunications device such as a mobile telephone or personal digital assistant (PDA), a counter-top or bar-top gaming terminal, or other personal electronic device, such as a portable television, MP3 player, entertainment device, etcetera. Finally, the drawings presented herein are not to scale and are provided purely for instructional purposes; as such, the individual and relative dimensions shown in the drawings are not to be considered limiting.

The gaming terminal 10 illustrated in FIG. 1A comprises a cabinet or housing 12. For output devices, this embodiment of the gaming terminal 10 includes, for example, a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1A includes, for example, a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433, to Loose et al., entitled "Reel Spinning Slot Machine with Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1A. The primary display area 14 includes, in relation to many aspects of wagering games conducted on the gaming terminal 10, one or more paylines 30 (see FIG. 3) extending along a portion of the primary display area.

In the illustrated embodiment of FIG. 1A, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1A is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1A, a mouse, a joy stick, a switch, a microphone, and/or a touch screen 38 mounted over the primary display area 14 and/or the secondary display area 16 and having one or more soft touch keys 40, as is also shown in FIG. 1A. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Application Publication No. 2004/0023721 A1, to Giobbi, which is entitled "Portable Data Unit for Communicating with Gaming Machine over Wireless Link," and is incorporated herein by reference in its entirety. The noted account associated with cashless gaming is, in some aspects of the present concepts, stored at an external system 46 (see FIG. 2) as more fully disclosed in U.S. Pat. No. 6,280,328, to Holch et al., which is entitled "Cashless Computerized Video Game System and Method," and is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 1B:
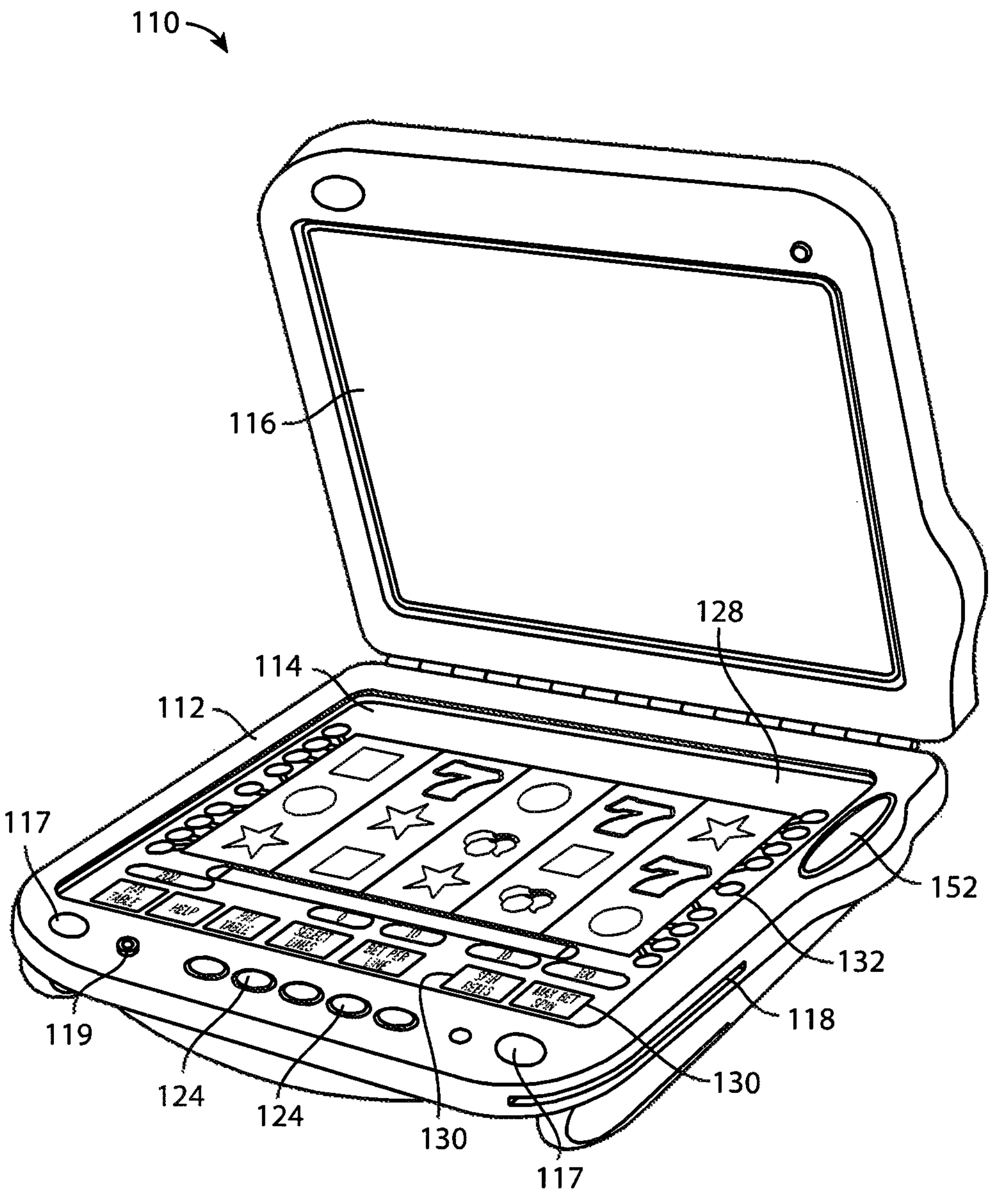
FIG. 1B is a perspective-view illustration of an exemplary handheld gaming device according to an embodiment of the present disclosure.

Depicted in FIG. 1B is a handheld or mobile gaming machine 110. Like the free standing gaming machine 10, the handheld gaming machine 110 is preferably an electronic gaming machine configured to play a video casino game such as, but not limited to, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1B, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1B, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1B, comprises a biometric sensing device.

The handheld device may incorporate the same features as the gaming terminal 10, or variations thereof. A more detailed description of a handheld device that may be utilized with the present disclosure can be found in PCT Patent Application No. PCT/US2007/000792, filed Jan. 26, 2007, and entitled "Handheld Device for Wagering Games," which is incorporated herein by reference in its entirety.

Figure 2:
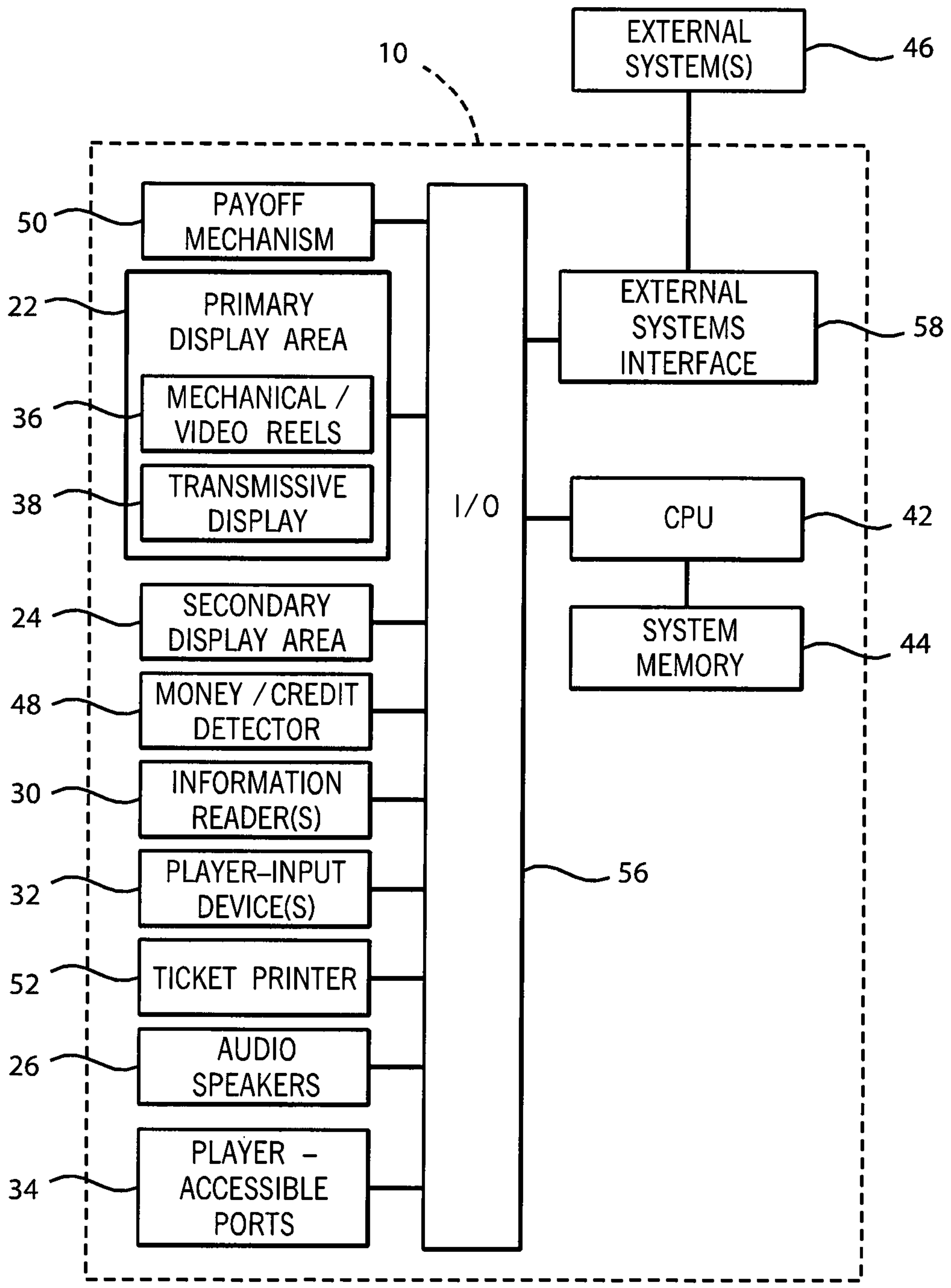
FIG. 2 is a schematic diagram of an exemplary gaming system according to an embodiment of the present disclosure.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device (s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
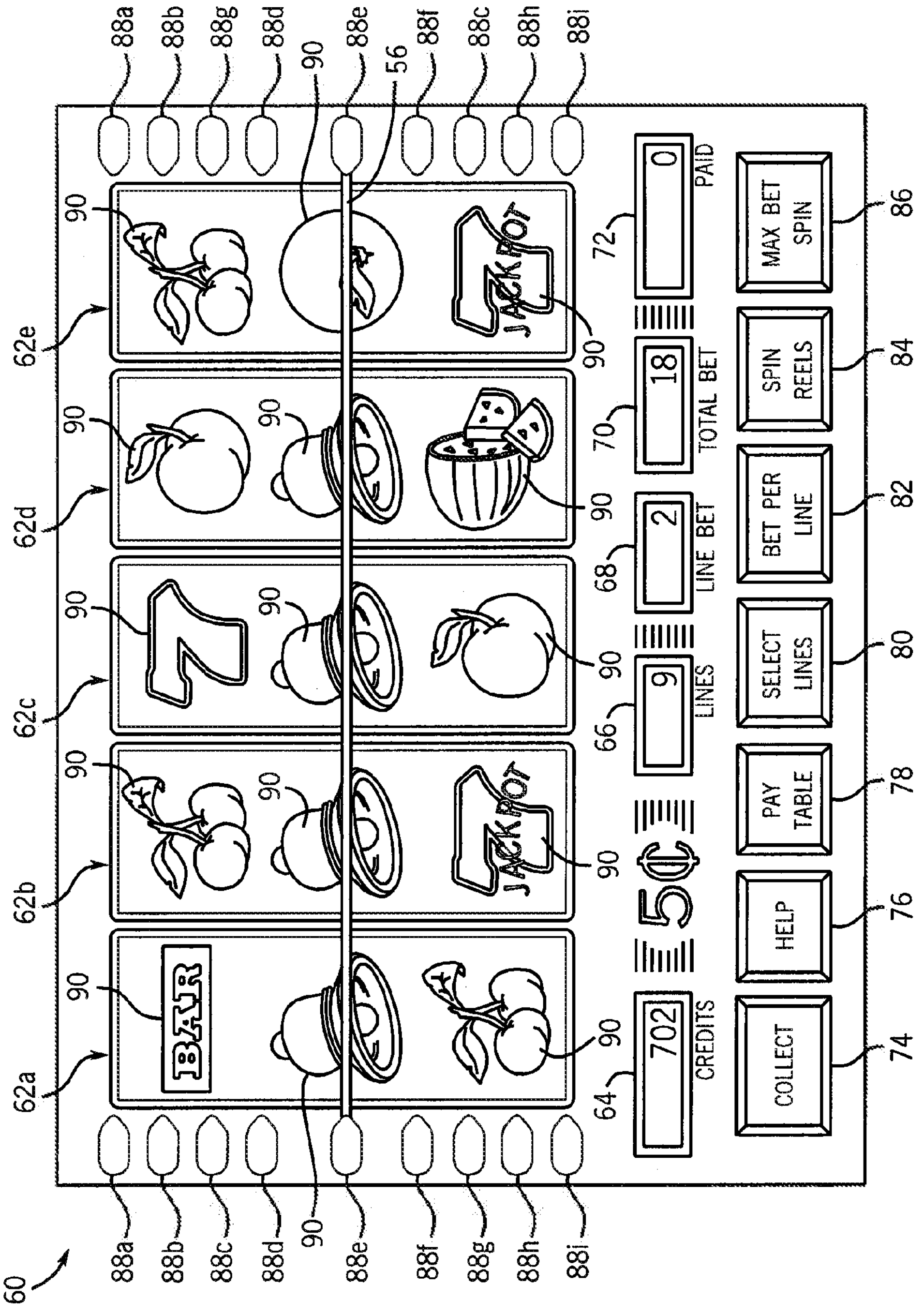
FIG. 3 is a screen shot of a basic-game screen from an exemplary wagering game that may be played on the gaming terminal of FIG. 1A, the handheld gaming device of FIG. 1B, and/or the gaming system of FIG. 2.

Referring now to FIG. 3, an image of a basic-game screen 60 adapted to be displayed on the primary display area 14 is illustrated, according to one embodiment of the present disclosure. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming terminal or gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1A, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is effected, for example, by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example).

As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present disclosure does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, diagonally, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present disclosure. Additionally, though an embodiment with five reels is shown in FIG. 3, different embodiments of the gaming terminal 10 comprise a greater or lesser number of reels in accordance with the present disclosure.

Figure 4:
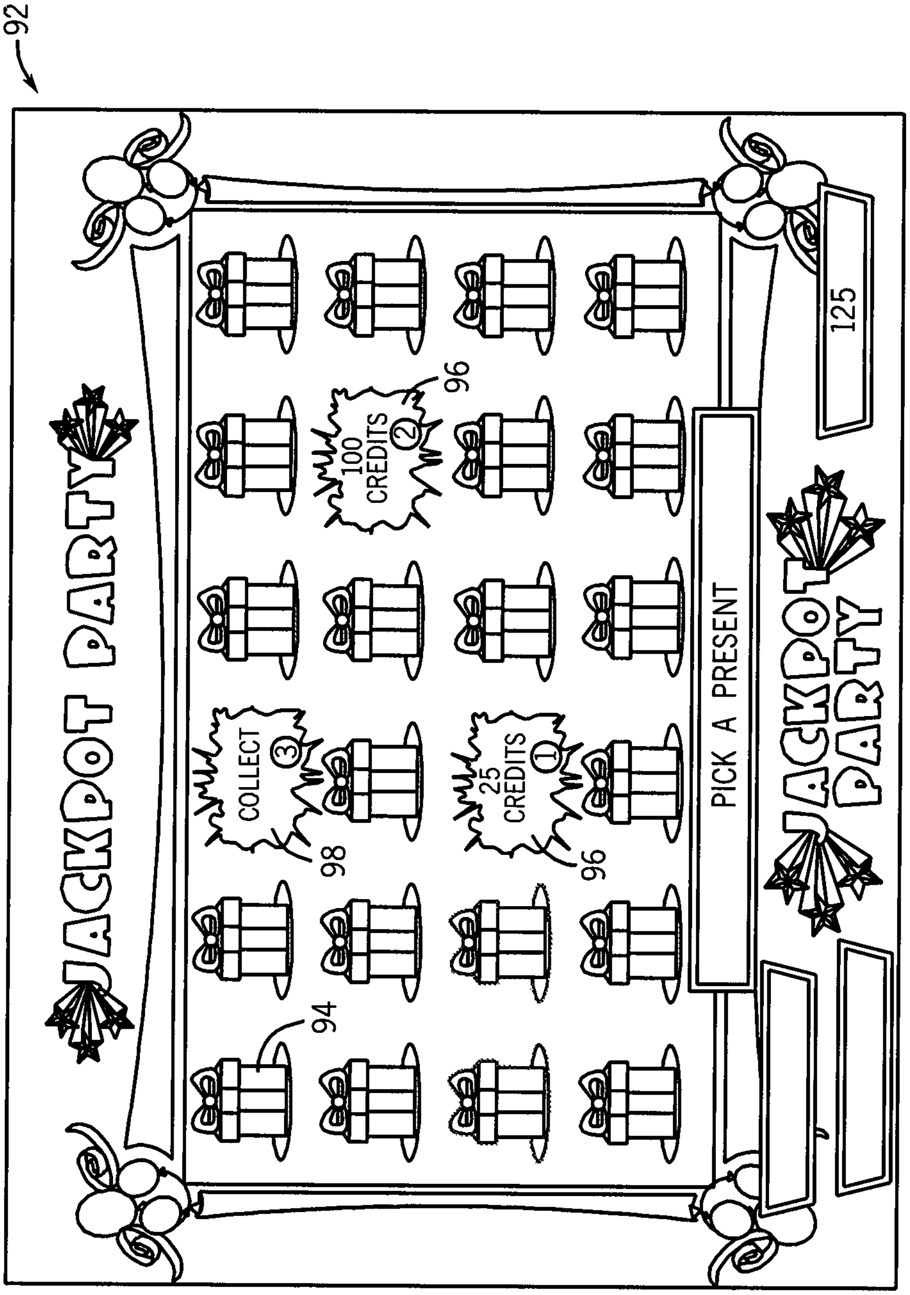
FIG. 4 is a screen shot of a bonus-game screen from an exemplary wagering game that may be played on the gaming terminal of FIG. 1A, the handheld gaming device of FIG. 1B, and/or the gaming system of FIG. 2.

Turning now to FIG. 4, an example of a bonus game to a basic wagering game is illustrated. A bonus-game screen 92 includes an array of markers 94 located in a plurality of columns and rows. The bonus game is entered upon the occurrence of a triggering event, such as the occurrence of a start-bonus game outcome (e.g., symbol trigger, mystery trigger, time-based trigger, etc.) in or during the basic wagering game. Alternatively, any bonus game described herein is able to be deployed as a stand-alone wagering game independent of a basic wagering game.

In the illustrated bonus game of FIG. 4, a player selects, one at a time, from the array of markers 94 to reveal an associated bonus-game outcome. According to one embodiment of this bonus game, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5:
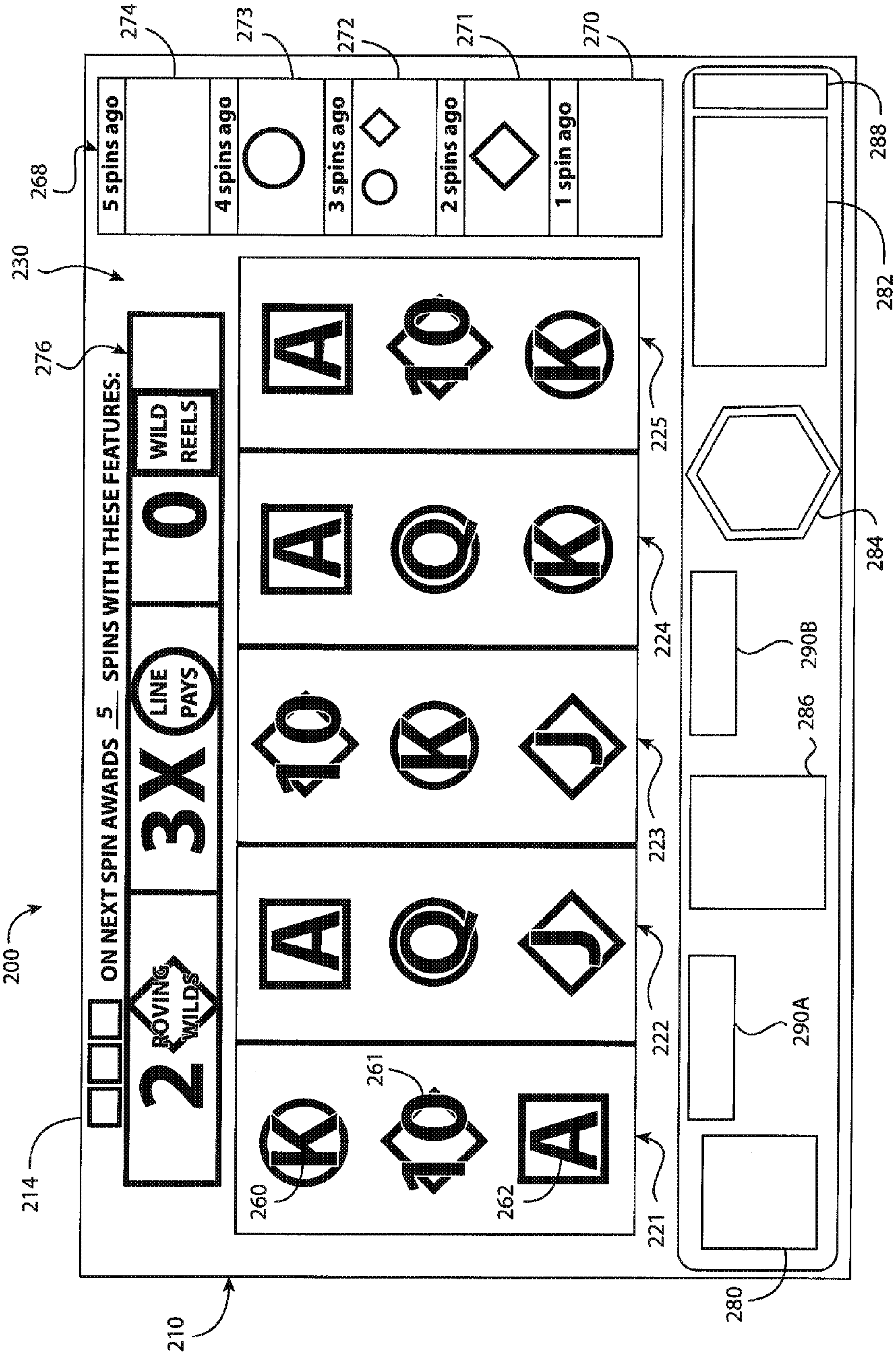
FIG. 5 is a screen shot of a display displaying an exemplary wagering game with various representative bonus-game-modifiers added to a feature pool in accordance with an embodiment of the present disclosure.

Referring now to FIG. 5, a display device 214 of a gaming device or terminal 210 of a gaming system 200 is shown. The device or terminal 210 may be a freestanding gaming device (networked or standalone) as seen, for example, in FIG. 1A, a handheld gaming device as seen, for example, in FIG. 1B, or any other device having a display device 214. The display device 214 may be any form of display device, such as those described above with reference to the free standing and handheld devices of FIGS. 1A and 1B, respectively.

The display device 214 includes a display of a wagering game 230, which in this example is a slot game shown in FIG. 5. The wagering game 230 includes a base game and a bonus game triggered in response to an occurrence of an event during the base game. The wagering game 230 includes a plurality of symbol-bearing reels, designated generally as 221-225, respectively, each having a plurality of distinct symbol positions and bearing an array of symbols (collectively represented by symbols 260-262 in FIG. 5). The symbols may include any variety of graphical symbols, emblems, elements, or representations, including symbols that are associated with one or more themes (e.g., a "Five Card Draw" poker theme) of the gaming terminal 210 or system 200. The symbols may also include a blank symbol or empty space. The symbols on the reels 221-225 are arranged in an array or matrix, which in this embodiment is a 3×5 matrix of symbols. The symbols can be displayed on the reels 221-225 as part of a base game of the wagering game 230 (referred to as base-game symbols) or as part of a bonus game of the wagering game 230 (referred to as bonus-game symbols), or both. The reels 221-225 are varied (e.g., spun and stopped) to reveal combinations of symbols, which represent randomly selected outcomes of the wagering game 230, that are evaluated for winning combinations. Winning combinations of symbols landing, for example, on activated paylines (e.g., those paylines for which a wager has been received), cause awards to be paid in accordance with one or more pay tables associated with the gaming system 200.

The wagering game 230 can include fewer or additional symbol-bearing reels (simulated, mechanical, or combinations thereof) than those shown in FIG. 5. Moreover, the randomly selected outcomes of the wagering game 230 may be varied from the representation provided in FIG. 5. By way of non-limiting example, the randomly selected outcomes may comprise greater or fewer than 15 symbols. Likewise, the "Five Card Draw" poker game theme is purely illustrative and non-limiting in nature.

The primary display device 214 further includes certain display features for providing information and options to a player. For example, the display features may include a MENU/HELP button 280, a WIN meter 282, a CREDITS meter 284, and a BET meter 286. The MENU/HELP button 280 can be pressed and/or activated (e.g., through an overlying touch screen) by a player desiring to access other control menus, preferences, help screens, etc. For example, the player can change a theme of the wagering game 230 via the MENU/HELP button 280, or change the type of wagering game being played (e.g., to video poker, keno, etc.). The WIN meter 282 displays to the player the amount of the total win (if any) from the most recent play of the wagering game 230. The CREDITS meter 284 displays to the player the total amount of credits (if any) remaining and available to the player for play of the wagering game 230. The BET meter 286 displays to a player the current size of his/her wager (in credits). Fewer, additional or alternative display features may be included for presenting information/options to a player. For example, the display device 214 may include an optional CHANGE DENOM button 288 that can be activated to change the denomination of wagers that the player is inputting into the system 200, bet change buttons 290A and 290B that permit a player to increase and decrease the size of his/her wager accordingly, a "max bet spin" button (e.g., the button 86 of FIG. 3) for wagering a maximum number of credits and spinning the reels 221-225 of the wagering game 230, as well as any of the credits and meters displayed in FIG. 3.

In the base game of the wagering game 230 of FIG. 5, at least some of the base-game symbols borne by the reels 221-225 are divided into different types, with each type of base game symbol being linked to or otherwise associated with a particular bonus-game-modifier. A bonus-game-modifier appears in the base game of the wagering game 230 and can modify one or more aspects of the bonus game of the wagering game 230. For instance, in FIG. 5, all of the Ace Cards borne by the reels 221-225, each of which is designated with an "A" symbol, are associated with a WILD REELS bonus-game-modifier. In addition, all of the 10-Cards and Jack Cards borne by the reels 221-225, respectively designated via symbols "10" and "J" in FIG. 5, are associated with a ROVING WILDS bonus-game-modifier, Likewise, all of the King Cards and Queen Cards borne by the reels 221-225, respectively designated via symbols "K" and "Q" in FIG. 5, are associated with a LINE-PAY MULTIPLIER bonus-game-modifier. In alternative configurations, preselected symbols, randomly selected symbols, all symbols, fewer than all symbols, and combinations thereof may be divided into types and connected to a particular bonus-game-modifier within the scope of the present disclosure.

In some embodiments, the linking or association between the reel-borne symbols and the bonus-game-modifiers is visually depicted on the display device 214 so that the player can see which bonus-game-modifier is associated with which base-game symbol. For instance, each type of bonus-game-modifier illustrated in FIG. 5 is visually represented by a specific indicium—ROVING WILDS being visually represented by a diamond indicium ◇, LINE-PAY MULTIPLIERS being visually represented by a circle indicium O, and WILD REELS being represented by a square indicium □. Certainly other indicia, such as numbers, pictures, animations, etc., may be employed to visually depict the bonus-game-modifiers on the display device 214. In this example, the linking or association between the reel-borne symbols and the bonus-game-modifiers is visually depicted by overlapping or overlaying or superimposing each reel-borne symbol with the indicium that represents the respective bonus-game-modifier associated therewith. In the above example, each 10 and J symbol overlaps a diamond indicium ◇, each K and Q symbol overlaps a circle indicium O, and each A symbol overlaps a square indicium □. Recognizably, the association between symbol and modifier can be achieved by implementations other than the overlapping of symbols and indicia shown in FIG. 5. For example, a schedule may provided on the side of the reels 221-225 (or any other location of the display device 214, gaming device 210 or gaming system 200), which explicates which base-game symbols are associated with what bonus-game-modifiers.

A "bonus-game-modifier," as used herein, designates a randomly generated feature from the base game that, when activated, affects the play and/or outcome of the bonus game. By "randomly generated," it is meant that which particular bonus-game-modifier or modifiers may appear during play of any given base game is randomly determined, but its effect on a later bonus game is predetermined (e.g., how it affects the play and/or outcome of the bonus game), as explained in more detail below. A bonus-game-modifier can enhance the play and/or outcome of a bonus game. By way of non-limiting example, the bonus-game-modifier affects the play or outcome of the bonus game by, for example, modifying one or more of the bonus game symbols on the reels 221-225, modifying a function of one or more of the bonus-game symbols on the reels 221-225, modifying a function of one or more of the bonus-game symbol positions, modifying how the randomly selected bonus-game symbols are evaluated for winning combinations, modifying the award associated with the wagering game 230, and any combination thereof. In FIG. 5, for example, the ROVING WILD bonus-game-modifier, when activated, introduces a wild symbol into the display device 214 that can travel between different symbol positions and modify one or more bonus-game symbols on the reels 221-225 (e.g., the wild symbol replaces a randomly selected symbol in the bonus game with a different symbol). The LINE-PAY MULTIPLIER bonus-game-modifier, on the other hand, will modify the bonus game by multiplying the amount of an award associated with a particular line pay by a predetermined multiplier (e.g., a 3× multiplier in FIG. 5). The WILD REELS bonus-game-modifier, when activated, will replace all of the bonus-game symbols on one or more of the reels 221-225 with a wild symbol. In some embodiments, each wild symbol substitutes for any other standard symbol to complete or form winning combinations during play of the bonus game. The bonus-game-modifiers could also have features that diminish instead of enhance the bonus game. In alternative embodiments, one or more of the bonus-game-modifiers can restrict play or diminish an outcome of a bonus game.

A portion of the display device 214 in FIG. 5 displays a feature pool 268 for displaying bonus-game-modifiers accumulated during sequential or parallel plays of the base game, which are available for usage during the bonus game to modify an aspect of the bonus game. There are five stored bonus-game-modifier fields 274-278 (also referred to herein as "storage fields") in the illustrated feature pool 268. Each storage field 270, 271, 272, 273, 274 is configured to display a bonus-game-modifier. The feature pool 268 therefore acts as a record of what types of bonus-game-modifiers have been achieved or accumulated in the last five plays of the base game. The bonus-game-modifiers displayed in the feature pool 268 determine how a triggered bonus game is modified. The feature pool 268 is positioned to the right of the symbol-bearing reels 221-225 in FIG. 5, vertically oriented with the storage fields 270-274 stacked first-to-last from bottom-to-top. The location of the feature pool 268 and arrangement of the storage fields 270-274 may be modified from that shown in the drawings. In addition, the feature pool 268 can include fewer or additional storage fields than those shown in FIG. 5. An optional box score 276 may also be displayed via the display device 214, providing a visual summary of the bonus-game-modifiers in the feature pool 268 that will be awarded if the bonus game is triggered. In some embodiments, if a bonus-game-modifier is displayed in the feature pool 268, it is available for usage during the bonus game of the wagering game 230; however, if it is not displayed in the feature pool 268, it is not available for usage during the bonus game. In other words, the feature pool 268 may store more than five bonus-game-modifiers at a time; however, only those bonus-game-modifiers that are displayed in the storage fields 274-278 in the feature pool 268 are available for usage during the bonus game.

Due to the limited number of storage fields 274-278 in the feature pool 268 of FIG. 5, the turnover of bonus-game-modifiers occurs relatively quickly. That is, after five sequential or parallel plays of the base game, all of the bonus-game-modifiers in the feature pool 268 have been cycled. By reducing the cycle time, the frequency by which bonus-game-modifiers appear in the feature pool 268 can be commensurately increased without increasing the volatility of the wagering game. An advantage to having a limited feature pool 268, and thus a higher frequency by which bonus-game-modifiers appear in the feature pool 268, is that the wagering game 230 can be put into an advantageous state in a relatively quick timeframe (e.g., when starting from an empty feature pool 268). As such, players are less likely to wait to start playing the wagering game until it is in an improved state.

In some embodiments, which bonus-game-modifiers are added to the feature pool 268, and thus affect the bonus game, are randomly determined during play of the base game. In some embodiments, a minimum of three identical bonus-game-modifier indicia must appear on a winning payline in the base game for the bonus-game-modifier associated with those indicia to be added to the feature pool 268 for use during the bonus game. This aspect will be clarified below in the discussion of FIG. 7. In alternative configurations, fewer than three indicium on a winning payline of the base game can trigger inclusion of the associated bonus-game-modifier in the feature pool 268. Alternatively, the base game payline need not be "winning" per se (e.g., a winning combination of reel-borne symbols aligned along a payline for which a wager has been received), but rather just be an activated payline (i.e., a payline for which a wager has been received). According to another option, the bonus-game-modifier indicia need not be aligned along a base game payline at all. Rather, the appearance of a predetermined number of indicia anywhere on the reels 221-225 as part of an outcome of the base game can trigger inclusion of the associated bonus-game-modifier in the feature pool 268.

In some embodiments, the feature pool 268 stores and displays bonus-game-modifiers in sequential order (e.g., chronologically). For example, the bonus-game-modifiers may be arranged in consecutive order, e.g., from bottom-to-top in FIG. 5, when the base games are played sequentially, with the most recent stored bonus-game-modifier displayed in the bottom most storage field 270 and the oldest stored bonus-game-modifier displayed in the top most storage field 274. Storing bonus-game-modifier in sequential order may comprise shifting the bonus-game-modifier(s) in the feature pool 268 bottom to top, and storing any bonus-game-modifier (s) achieved during the most recent play of the base game into the first storage field 270 of the feature pool 268. Prior to, contemporaneous with, or after each play of the base game, the bonus-game-modifiers stored in the feature pool 268 are shifted up one storage field, as will be explained in further detail below with respect to FIGS. 5-7. Finally, the bonus-game-modifier stored in the last/fifth storage field 274 is removed from the feature pool 268, thereby making it no longer available to modify subsequently initiated bonus games. The aforementioned cycling of bonus-game-modifiers through the feature pool 268 is known as a first-in-first-out (FIFO) queue. When the base games are played in series, the bonus-game-modifiers can be stored in the feature pool 268 in the temporal order that they are accumulated, for example. In other implementations, the feature pool 268 is not displayed to the player, creating a more exciting and mysterious experience for the player.

In alternative embodiments, the storage fields 270-274 may be "ordered" in a variety of different sequences, patterns, and other arrangements through which the bonus-game-modifiers are shifted or traversed as described herein. By way of example, and not limitation, the feature pool 268 can be depleted at random times or periodically, or the bonus-game-modifiers can be removed in a random manner from the feature pool 268. Alternatively, each type of bonus-game-modifier may have a preestablished or random duration, after which that bonus-game-modifier is removed from the feature pool 268. Also, each bonus-game-modifier that is removed from the feature pool 268 without having been applied to a bonus game can "age out," converting the bonus-game-modifier into a bonus award. Expiring or soon-to-be expiring bonus-game-modifiers can be animated or highlighted—using, for example, a blink, glow, shake, or spin, etc. effect—to show they are expiring soon and become increasingly exaggerated or frenetic when their expiration is imminent. In another optional configuration, the feature pool 268 and the box score 276 can be hidden from the player, making the game more mysterious. The feature pool 268 can also be shown on a separate display than the wagering game 230. To that end, the feature pool 268 can be purely graphical, with no words. It is also possible to modify the base game with one or more pooled features, not just the bonus game.

Continuing with the above example, the first storage field 270 is empty in FIG. 5, indicating that a bonus-game-modifier was not achieved during the previous play of the base game. Contrastingly, the second storage field 271 in FIG. 5 includes a diamond indicium ◇, indicating that a ROVING WILD bonus-game-modifier was achieved during play of the base game prior to the previous play. The third storage field 272 in FIG. 5, on the other hand, includes a diamond indicium ◇ and a circle indicium O. The third storage field 272 therefore indicates that a ROVING WILD bonus-game-modifier and a LINE-PAY MULTIPLIER bonus-game-modifier were achieved during the third-prior play of the base game. The fourth storage field 273 in FIG. 5 includes a circle indicium O, thus indicating that a LINE-PAY MULTIPLIER bonus-game-modifier was achieved during the fourth-prior play of the base game. Finally, the fifth storage field 274 is empty in FIG. 5, indicating that a bonus-game-modifier was not achieved during the fifth-prior play of the base game.

Figure 6:
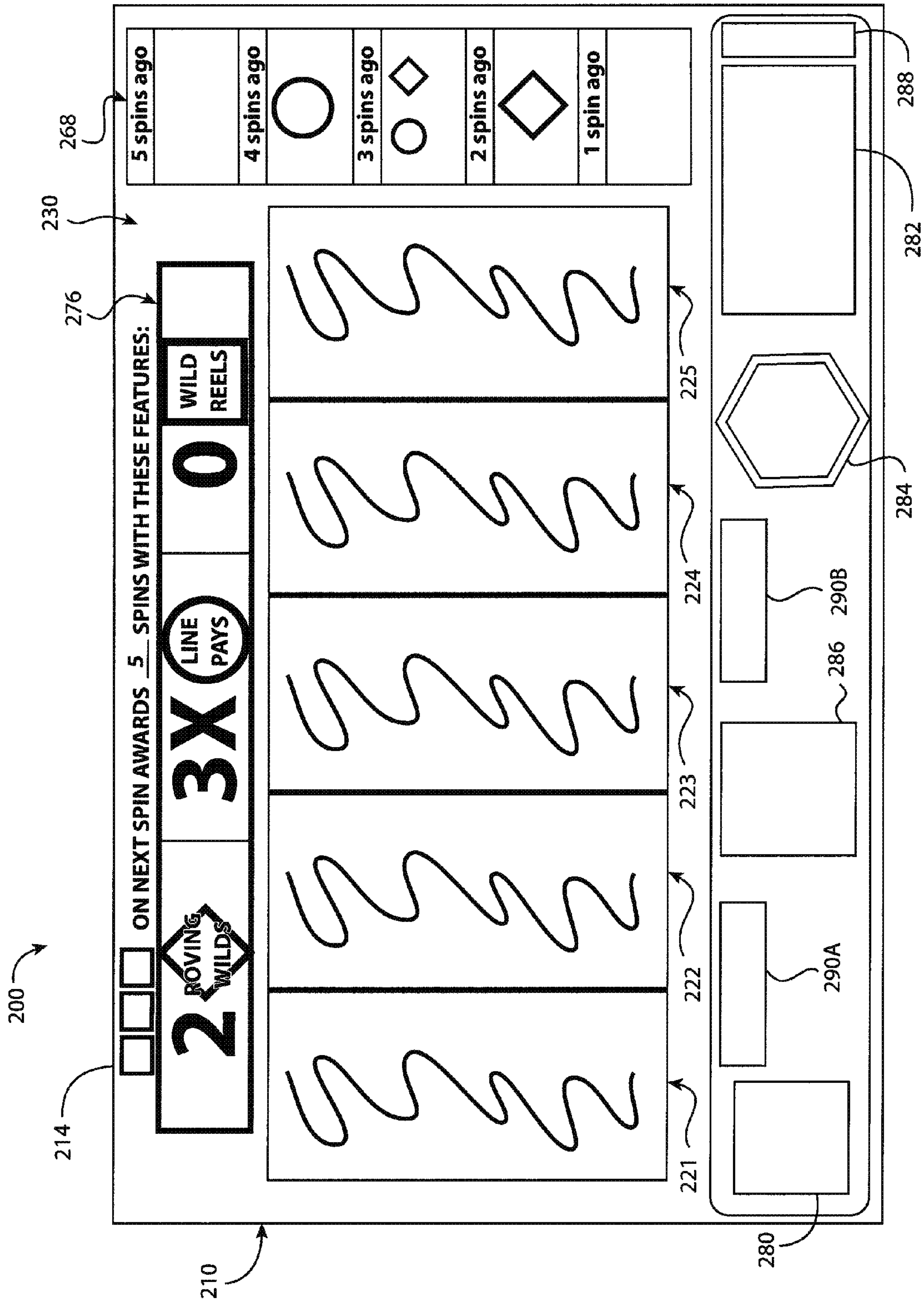
FIG. 6 is a screen shot of a display displaying the exemplary wagering game of FIG. 5 while a set of symbol-bearing reels of the wagering game are spinning.

Turning to FIG. 6, the wagering game 230 is shown after play of the base game is initiated, for example, by the player pushing or activating a spin button or pulling a spin lever. The monetary wager (e.g., a selected number of credits) is deducted from the available credits, as displayed via the CREDITS meter 284. The monetary wager that is in play can be displayed via the BET meter 286. FIG. 6 illustrates the reels 221-225 being varied—e.g., spun and stopped; the reels continue to spin until they are stopped to reveal combinations of symbols which represent a randomly selected outcome of the base game, as seen in FIG. 7.

Figure 7:
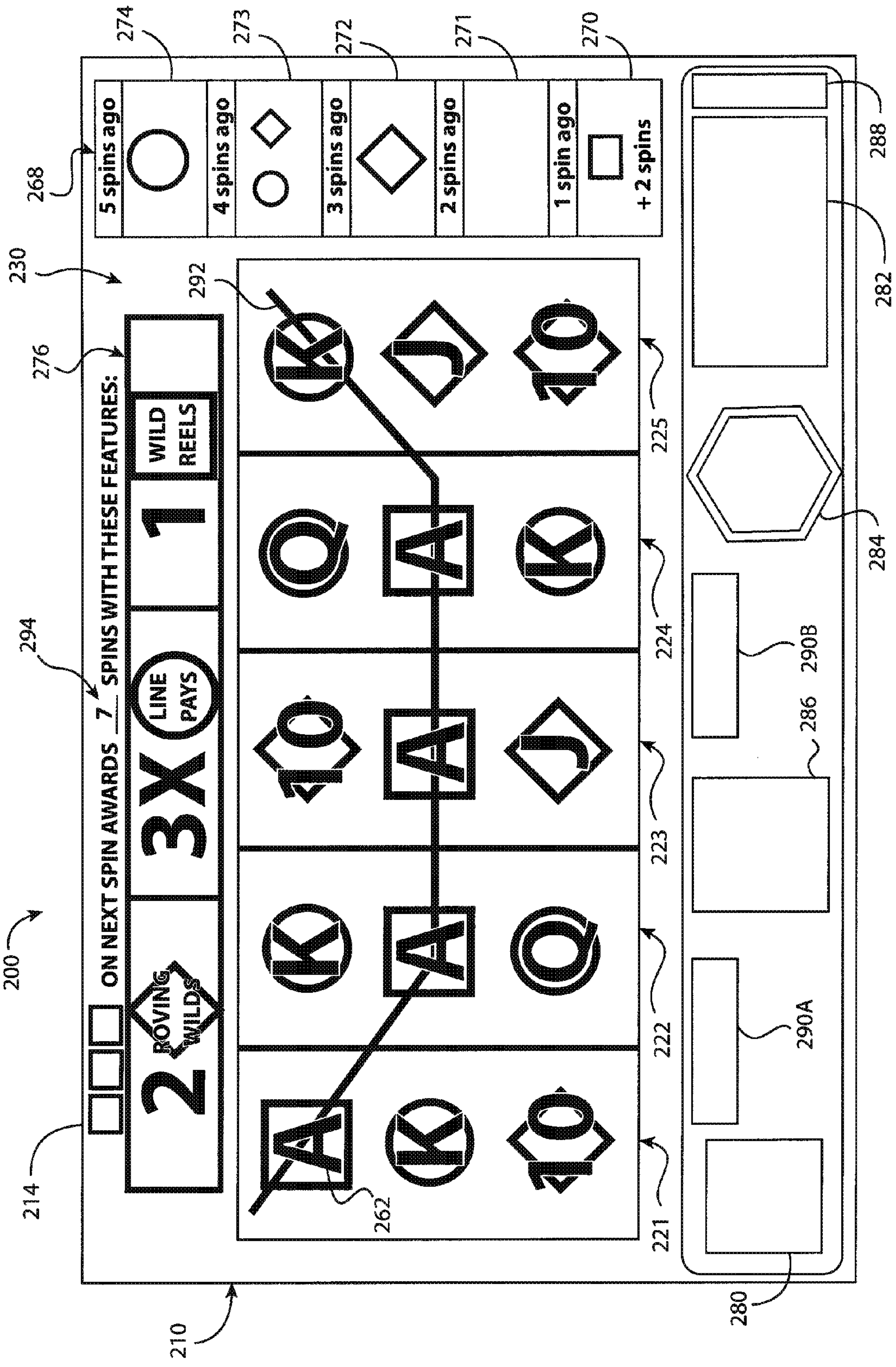
FIG. 7 is a screen shot of a display displaying the exemplary wagering game of FIG. 5 after the symbol-bearing reels of the wagering game finish spinning and the feature pool is updated to include another representative bonus-game-modifier.

FIG. 7 provides an exemplary screen shot of the display device 214 displaying the wagering game 230 after completion of the game play illustrated in FIG. 6. In this example, the completed game play results in a winning outcome in the base game—four Ace Card symbols 262 are aligned on an active payline 292, which results in a predetermined credit award, which may be displayed to the player on display device 214 in WIN meter 282. The resultant award may subsequently be added to the CREDITS meter 284, and is therefore available to the player for subsequent play of the wagering game 230.

The embodiment of FIG. 7 also depicts a predetermined event in the base game 230 that causes a bonus-game-modifier to be added to the feature pool 268. The predetermined event exemplified in FIG. 7 is a symbol-driven trigger comprising a particular outcome (e.g., arrangement of symbols) in the base game. As described above, some embodiments require a minimum of three identical bonus-game-modifier indicia to appear on a winning payline for the bonus-game-modifier associated with those indicia to be added to the feature pool 268. FIG. 7 depicts four square indicia □ aligned on the winning payline 292. As a result, a WILD REEL bonus-game-modifier is added to the feature pool 268. FIG. 7 shows the updated feature pool 268, which now reflects the addition of a WILD REEL square indicium □ to the first storage field 270 of the feature pool 268. Moreover, the previous content of the first storage field 270, as seen in FIGS. 5 and 6, is shifted into the second storage field 271 in FIG. 7; the previous content of the second storage field 271 (i.e., a ROVING WILDS diamond indicium ◇) is shifted into the third storage field 272 in FIG. 7; the previous content of the third storage field 272 (i.e., a LINE-PAY MULTIPLIERS circle indicium O and a ROVING WILDS diamond indicium ◇) is shifted into the fourth storage field 273 in FIG. 7; and, finally, the previous content of the fourth storage field 273 (i.e., a LINE-PAY MULTIPLIERS circle indicium O) is moved into the fifth storage field 274. The previous content of the fifth storage field 274 is removed from the feature pool 268 in FIG. 7, thereby making it no longer available to modify a triggered bonus game.

In addition to the features highlighted above, other optional features may be incorporated into the wagering game 230. For instance, 4- and 5-symbol win combinations in an outcome of the base game may award, in addition to a predetermined credit award, extra bonus spins during a subsequently triggered bonus game. By way of non-limiting example, if four reel-borne symbols align on an active payline in the base game, then a first predetermined number (e.g., 2) of free bonus game spins are awarded to the player to be played during the bonus game. In addition, if five reel-borne symbols align on an active payline in the base game, then a second predetermined number (e.g., 5) of free bonus game spins are awarded to the player. In FIG. 7, two free bonus game spins are awarded to the player because there are four Ace Card symbols 262 aligned on winning payline 292, as indicated by the addition of two bonus game spins to the BONUS SPIN meter 294 at the top of the display device 214.

Figure 8:
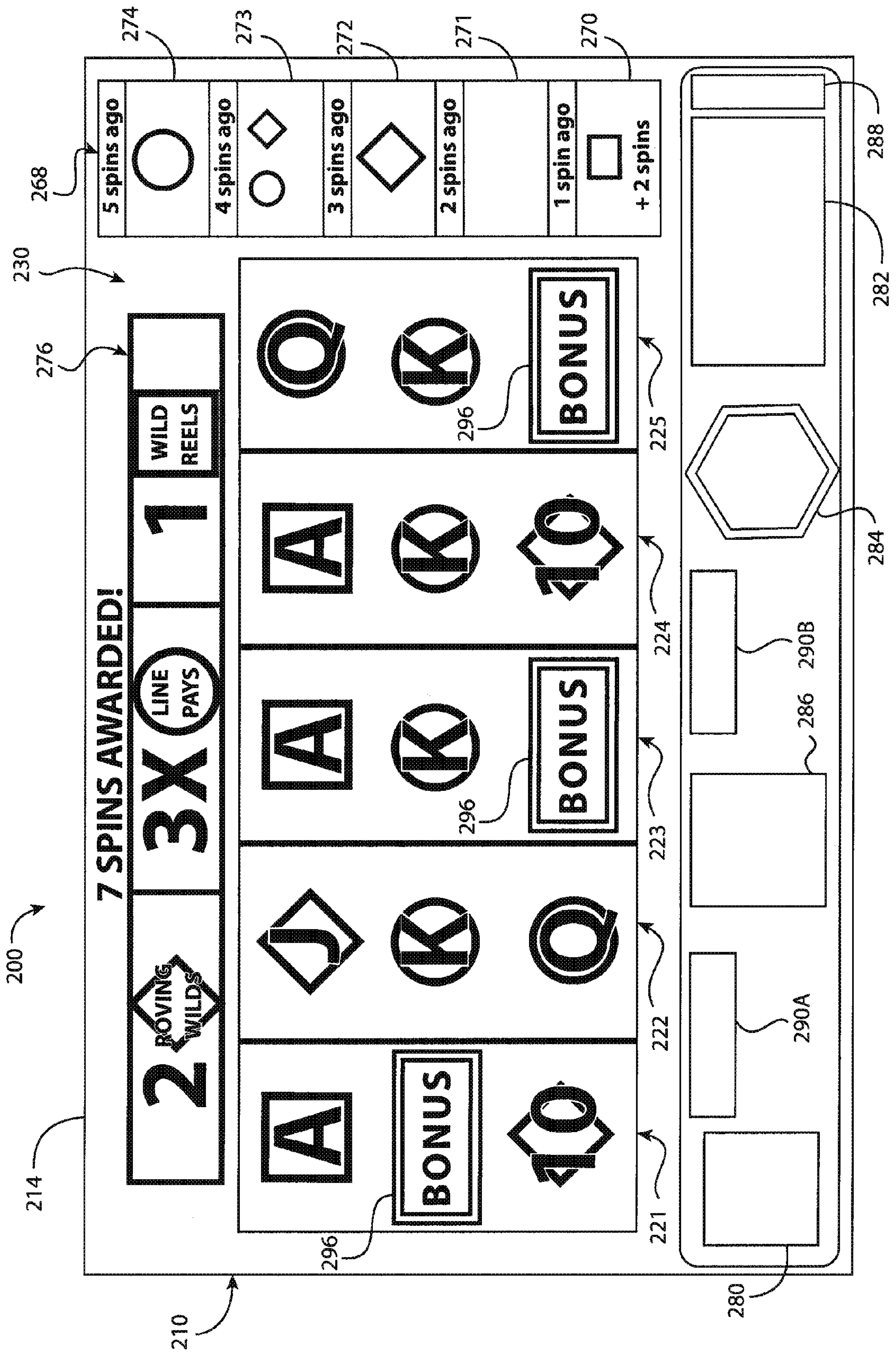
FIG. 8 is a screen shot of a display displaying the exemplary wagering game of FIG. 5, showing a representative triggering event that triggers a bonus game that is modified by the bonus-game-modifiers in the feature pool.

Referring now to FIG. 8, shown is an exemplary screen shot of the display device 214 illustrating an exemplary triggering event that initiates a bonus game. The triggering event exemplified in FIG. 8 is a symbol-driven triggering event. The symbol driven triggering event in this embodiment comprises a particular outcome (e.g., arrangement of symbols) in the base game. As seen in the example of FIG. 8, three or more BONUS symbols 296 appearing simultaneously in an outcome of the base game triggers a bonus game. In other embodiments, triggering events may include an alternate symbol-driven event, a threshold time playing a wagering game (time on device), total wagers input meeting a predetermined amount (coin in), accumulation of a certain amount of credits, points, or assets, satisfaction of a predetermined number of sequential winning outcomes, etc.

The bonus game may comprise a free-spin bonus game where a plurality of displayed symbol-bearing bonus reels, which may be the same reels 221-225 of the base game, are varied (e.g., spun and stopped) to display randomly selected symbols at respective positions on the reels. The player can be awarded an award based on an evaluation of the randomly selected symbols. For each of the previously awarded free spins (e.g., 7 times in FIG. 8), the symbol-bearing bonus reels are varied and evaluated during the free-spin bonus game. Each play of the bonus game is modified by all, some, or one of the bonus-game-modifiers accumulated in the feature pool 268 over the last five plays of the base game. In FIG. 8, for example, each bonus spin is modified with two ROVING WILDS, one WILD REEL, and a LINE-PAY MULTIPLIER (increased from a 2× multiplier to a 3× multiplier in FIG. 8 because of the two circle indicia O in the feature pool 268). The triggering event of FIG. 8 is part of a randomly determined outcome of the base game; as such, the player has no control over when the features (e.g., bonus-game-modifiers) in the feature pool 268 are redeemed. Likewise, because the effect of each bonus-game-modifier of FIG. 8 is predetermined, the player has no control over how the bonus-game-modifiers affect the bonus game.

According to an optional configuration, each bonus-game-modifier in the feature pool 268 can be applied once for a single spin, thereafter being removed from the feature pool 268 such that the bonus-game-modifier is no longer available to modify subsequent spins of the bonus game. Alternatively, all of the bonus-game-modifiers in the feature pool 268 can be applied to only a single spin or predetermined number of spins of the bonus game reels. According to another option, the player may choose which bonus-game-modifier(s) in the feature pool 268 is applied for each spin of the bonus game reels. Alternatively, the gaming terminal 210 or controller 42, 46 can randomly select which bonus-game-modifier(s) in the feature pool 268 is applied for each spin of the bonus game reels.

According to another optional configuration, if the player wants to leave the wagering game 230 or the gaming terminal 210 and there are features (bonus-game-modifiers) remaining in the features pool 268, the player can cash out any remaining features to "empty" the feature pool 268 such that the player is not made to feel like he/she is leaving potential winnings for the next player. For example, each of the bonus-game-modifiers may have an assigned monetary equivalent. In this instance, when the player "cashes out," they are awarded a supplemental monetary award corresponding to the value of the accumulated bonus-game-modifiers remaining in the feature pool. Alternatively, the player may be provided with the option of saving the accumulated bonus-game-modifiers to a player account or player card such that the player can later recall and use the accumulated bonus-game-modifiers, for example, during a later play of the wagering game. As a further alternative, the feature pool may just be emptied, whereby the accumulated bonus-game-modifiers remaining in the feature pool are no longer available to the current player or any subsequent players. In contrast, the feature pool can retain its current state, whereby the accumulated bonus-game-modifiers remaining in the feature pool are available to the current player or a subsequent player.

Figure 9:
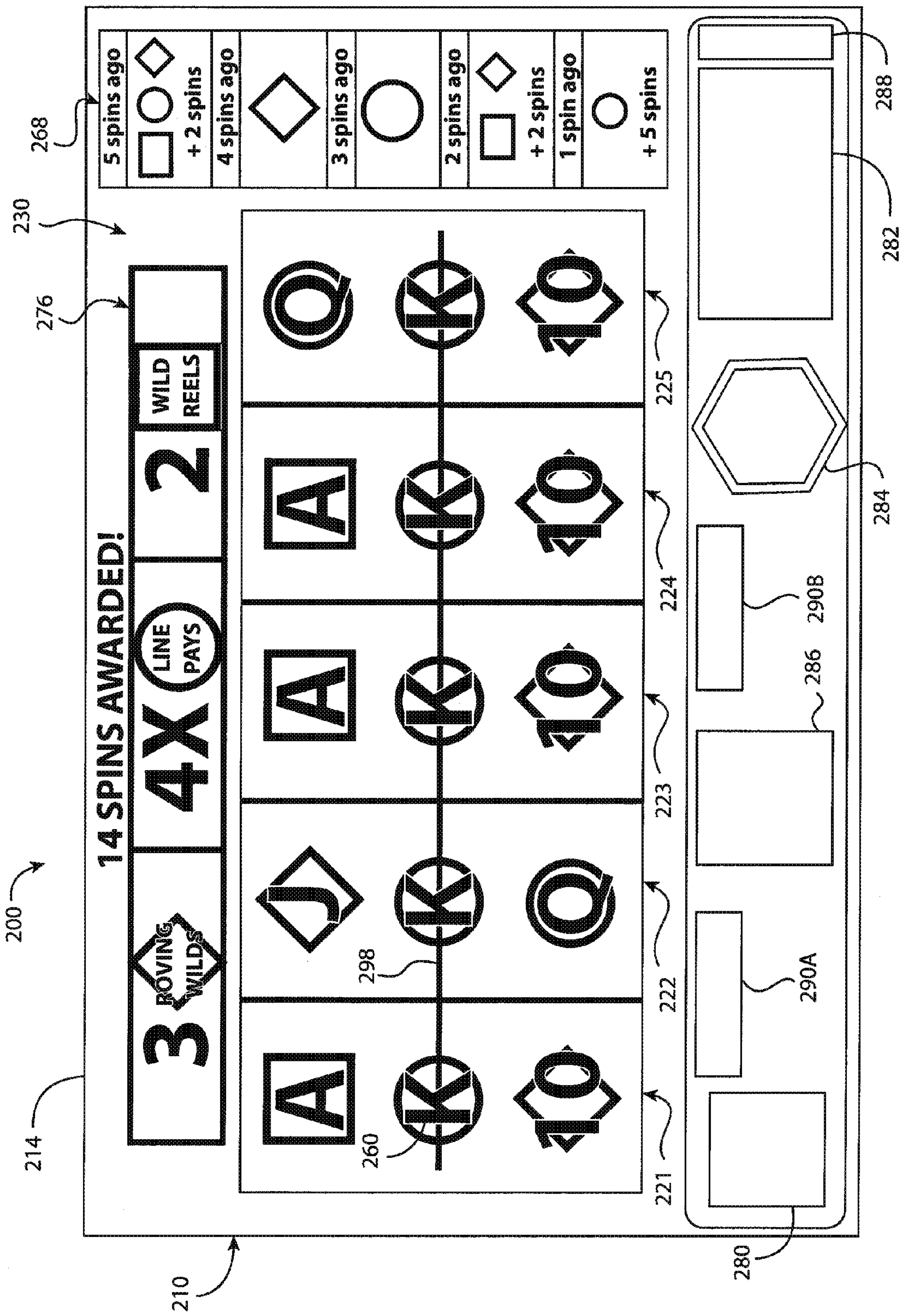
FIG. 9 is a screen shot of a display displaying the exemplary wagering game of FIG. 5, showing an alternative triggering event that triggers a bonus game that is modified by the bonus-game-modifiers in the feature pool.

Referring now to FIG. 9, shown is an exemplary screen shot of the display device 214 illustrating another triggering event that initiates a bonus game, which is modified by any, some, or all of the bonus-game-modifiers in the feature pool 268. The triggering event exemplified in FIG. 9 is a symbol-driven triggering event. The symbol driven triggering event in this embodiment comprises a predetermined number of sequential wins in the base game. For example, FIGS. 5-8 illustrate a plurality of base games being conducted in series (i.e., successively); for each of the conducted base games, at least one bonus-game-modifier is added to the feature pool 268 in response to a predetermined event occurring as part of the randomly determined outcome of the respective base game. In response to a triggering event, which in FIG. 9 is five back-to-back winning-plays of the base game, a bonus game, modified by the bonus-game-modifiers in the feature pool 268, is conducted.

FIG. 9 provides an exemplary screen shot of the display device 214 displaying the wagering game 230 after completion of the fifth of five successively winning game plays in the base game. In this example, the completed game play results in a winning outcome in the base game—five King Card symbols 260 are aligned on an active payline 298, which results in a predetermined credit award, which may be displayed to the player on display device 214 in WIN meter 282 and may be subsequently added to the CREDITS meter 284. Because five identical bonus-game-modifier indicia, namely five circle indicia O, appear on the winning payline 298, a LINE-PAY MULTIPLIER bonus-game-modifier is added to the first storage field 270 of the feature pool 268, and the box score 276 is updated to indicate that the multiplier is increased from 3× to 4×. In addition, because the winning outcome depicted in FIG. 9 includes a 5-symbol win combination, five free bonus game spins are awarded to the player. Finally, because the player has won in five consecutive plays of the base game, the bonus game is triggered with all the collected features in the feature pool 268 modifying the play and/or outcome of the bonus game. The bonus-game-modifiers can be applied in a similar manner in an implementation in which plays of the base game are played in parallel as opposed to sequentially. Five simultaneous winning outcomes achieved in five parallel plays of the base game can result in all of the bonus-game-modifiers being available to modify the play and/or outcome of the bonus game.

In some embodiments, different players can be playing at different gaming terminals that are part of a network of gaming terminals (e.g., a bank of wagering game terminals). The features collected by each player in the network of gaming terminals can be pooled together via a network and, perhaps, displayed on communal signage. When a bonus triggers, either individually or collectively, the networked machines, the individual, or both, receives the features pooled by all the connected machines for their bonus. When the base games are being played on a network of gaming terminals, the bonus-game-modifiers can be stored in the feature pool in the temporal order that they are accumulated, according to a priority of the gaming terminals on which the bonus-game-modifier was achieved, or according to a priority rank assigned to the player who achieved the bonus-game-modifier, for example.

Figure 10:
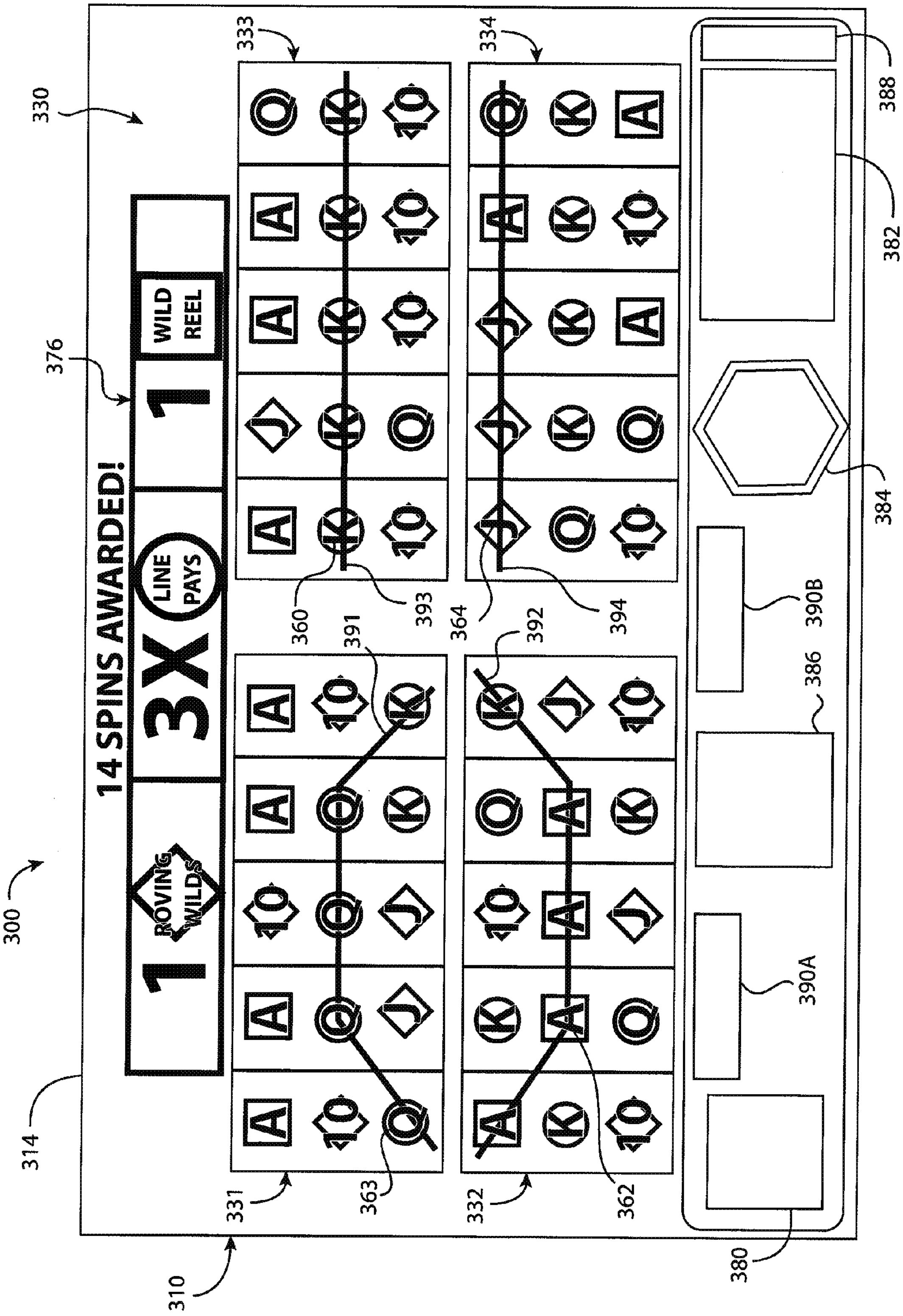
FIG. 10 is a screen shot of a display displaying a plurality of exemplary wagering games conducted in parallel in accordance with an embodiment of the present disclosure.

Referring now to FIG. 10, a display 314 of a gaming device or terminal 310 of a gaming system 300 is shown. The device or terminal 310 may be a freestanding gaming device (networked or standalone) as seen, for example, in FIG. 1A, a handheld gaming device as seen, for example, in FIG. 1B, or any other device having a display 314. The display 314 may be any form of display, such as those described above with reference to the free standing and handheld devices of FIGS. 1A and 1B, respectively.

The display 314 includes a display of a wagering game 330, which in this example includes four slot-type reel games 331, 332, 333, and 334, which can be played sequentially or in parallel (substantially simultaneously). Each of the individual reel games 331-334 of FIG. 10, similar to the wagering game 230 of FIGS. 5-9, includes a plurality of symbol-bearing reels (i.e., five reels for each reel game 331-334 in FIG. 10), each having a plurality of distinct symbol positions and bearing an array of symbols. The symbols may include any variety of graphical symbols, emblems, elements, or representations, including symbols that are associated with one or more themes (e.g., a “Five Card Draw” poker theme) of the gaming terminal 310 or system 300. The symbols may also include a blank symbol or empty space. The reels are varied (e.g., spun and stopped) to reveal combinations of symbols, which represent respective randomly selected outcomes of each reel game 331-334, that are evaluated for winning combinations. Winning combinations of symbols landing, for example, on activated paylines (e.g., those paylines for which a wager has been received), cause awards to be paid in accordance with one or more pay tables associated with the gaming system 300.

The primary display 314 further includes certain display features for providing information and options to a player. For example, the display features may include a MENU/HELP button 380, a WIN meter 382, a CREDITS meter 384, and a BET meter 386. The MENU/HELP button 380 can be pressed and activated (e.g., through an overlying touch screen) by a player desiring to access other control menus, preferences, help screens, etc. For example, the player can change a theme of the wagering game 330 via the MENU/HELP button 380, or change the type of wagering game being played (e.g., to video poker, keno, etc.). The WIN meter 382 displays to the player the amount of the total win (if any) from the most recent play of the wagering game 330. The CREDITS meter 384 displays to the player the total amount of credits (if any) remaining and available to the player for play of the wagering game 330. The BET meter 386 displays to a player the current size of his/her wager (in credits). Fewer, additional or alternative display features may be included for presenting information/options to a player. For example, the primary display 314 may include an optional CHANGE DENOM button 388 that can be activated to change the denomination of wagers which the player is inputting into the system 300, bet change buttons 390A and 390B that permit a player to increase and decrease the size of his/her wager accordingly, a “max bet spin” button (e.g., button 86 of FIG. 3) for wagering a maximum number of credits and spinning the reels of the reel games 331-334, as well as any of the credits and meters displayed in FIG. 3.

Similar to the wagering game 230 of FIGS. 5-9, at least some of the symbols borne by the reels in the reel games 331-334 of FIG. 10 are divided into different types, with each type of symbol being linked to or otherwise associated with a particular bonus-game-modifier. Also similar to the wagering game 230 of FIGS. 5-9, the linking or association between the reel-borne symbols and the bonus-game-modifiers is visually depicted on the display 314 of FIG. 10 by overlapping each reel-borne symbol with a specific indicium that represents the respective bonus-game-modifier associated therewith. Moreover, the bonus-game-modifiers that are awarded to the player are randomly determined during play of the base reel games 331-334. In contrast to the display device 214 of FIGS. 5-9, however, the display 314 of FIG. 10 does not display a feature pool, as explained below. In addition, the wagering game 330 may only require a single wager to initiate play of all four of the slot-type reel games 331, 332, 333, and 334. Alternatively, the wager amount may determine the number of games 331, 332, 333, and 334 that are played in parallel during play of the wagering game 330 (e.g., one credit initiates the first slot-type reel game 331; two credits initiates the first and second slot-type reel games 331, 332; three credits initiates the first, second and third slot-type reel games 331, 332, 33; etc.).

In FIG. 10, the base reel games 331-334 are played in parallel (i.e., generally simultaneously) instead of in series, like the wagering game 230 of FIGS. 5-9. In some embodiments, the bonus-game-modifiers achieved during the base reel games 331-334 are not added to a feature pool 268 and, thus, are not held there for successive plays of the wagering game 330. Rather, in the embodiment of FIG. 10, all reels in the base reel games 331-334 are varied generally simultaneously; and if a bonus game is triggered in response to the occurrence of a triggering event during any of the base games 331-334, those bonus-game-modifiers achieved during the base reel games 331-334 are applied to that bonus game.

FIG. 10 illustrates an exemplary triggering event that initiates a bonus game, which is modified by the bonus-game-modifiers achieved or accumulated during play of the base reel games 331-334. The triggering event exemplified in FIG. 10 is a symbol-driven triggering event. The symbol driven triggering event in this embodiment comprises at least one winning symbol combination in the outcome of each base game 331-334. For instance, the winning symbol combination in the first base game 331 of FIG. 10 comprises four Queen Card symbols 363 aligned on an active payline 391, which results in a predetermined credit award. Likewise, FIG. 10 depicts four circle indicia O aligned on the winning payline 391. As a result, a LINE-PAY MULTIPLIER bonus-game-modifier is added to a box score 376. The winning symbol combination in the second base game 332 of FIG. 10 comprises four Ace Card symbols 362 aligned on an active payline 392, which results in a predetermined credit award. Likewise, FIG. 10 depicts four square indicia □ aligned on the winning payline 392. As a result, a WILD REEL bonus-game-modifier is added to a box score 376. The winning symbol combination in the third base game 333 of FIG. 10 comprises five King Card symbols 360 aligned on an active payline 393, which results in a predetermined credit award. Likewise, FIG. 10 depicts five circle indicia O aligned on the winning payline 393. As a result, the LINE-PAY MULTIPLIER bonus-game-modifier in the box score 376 of FIG. 10 is increased to a 3× multiplier. Finally, the winning symbol combination in the fourth base game 334 of FIG. 10 comprises three Jack Card symbols 364 aligned on an active payline 394, which results in a predetermined credit award. Likewise, FIG. 10 depicts three diamond indicia ◊ aligned on the winning payline 394. As a result, a ROVING WILD bonus-game-modifier is added to the box score 376. Because the triggering event also occurred during the outcome of the wagering game 330 of FIG. 10, a bonus game, modified by the bonus-game-modifiers in the box score 376, is conducted.

Figure 11:
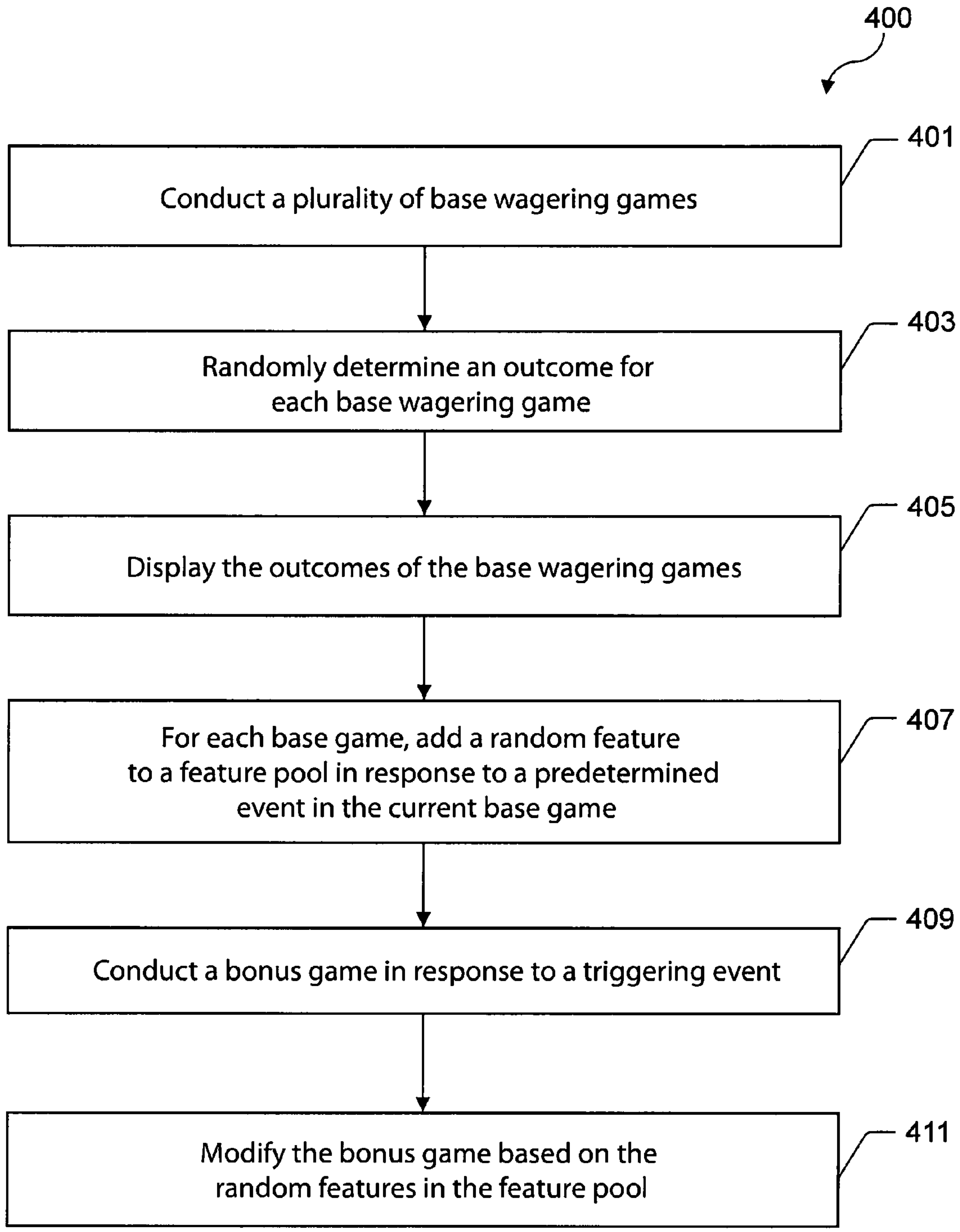
FIG. 11 is a flowchart for an algorithm that corresponds to instructions executed by a controller in accord with at least some aspects of the disclosed concepts.

With reference now to the flow chart of FIG. 11, an improved method (400) for conducting a wagering game in a gaming system is generally described in accordance with certain embodiments. FIG. 11 represents one algorithm that corresponds to at least some instructions that may be executed by the controller 42 and/or external systems 46 in FIG. 2 to perform any or all of the above described functions associated with the disclosed concepts. The instructions corresponding to the algorithm 400 can be stored on a non-transitory computer-readable medium, such as on a hard drive or other mass storage device or a memory device.

The exemplary algorithm 400 of FIG. 11 includes, at block 401, conducting a plurality of base wagering games, in series, in parallel, or both, using, for example, the CPU/controller 42 of FIG. 2. Each base wagering game may include those wagering games described above with respect to FIGS. 5-10, or any other suitable wagering game. At block 403, the method 400 includes randomly determining an outcome for each of the base wagering games and, at block 405, displaying the outcomes of the base wagering games. For each of the conducted base games, the method 400 includes at block 407 adding at least one random bonus-game-modifier (e.g., the ROVING WILD bonus-game-modifier, the WILD REELS bonus-game-modifier, or the LINE-PAY MULTIPLIER bonus-game-modifier of FIGS. 5-10) to a feature pool in response to a predetermined event (e.g., three or more bonus-game-modifiers appearing in the outcome of the base game on a payline) in the respective base game. Finally, the method 400 of FIG. 11 further comprises, at block 409, conducting a bonus game and, at block 411, modifying the bonus game based, at least in part, on any one, some, or all of the bonus-game-modifiers in the feature pool.

In some embodiments, the method includes at least those steps enumerated above. It is also within the scope and spirit of the present disclosure to omit steps, include additional steps, and/or modify the order presented above. It should be further noted that the method 400 represents a single play of a wagering game. However, it is expected that the method 400 be applied in a systematic and repetitive manner.

In the implementations discussed above, the bonus-game-modifier operates to affect play and/or an outcome of a bonus game. In another implementation, accumulated or pooled bonus-game-modifiers can operate to affect play and/or an outcome of the base game instead of the bonus game. Furthermore, bonus-game-modifiers can be added to the feature pool randomly after each spin of the base game, independent of any triggering event occurring in the base game, or they can be added to the feature pool based on a win threshold achieved in the base game such that a minimum number of credits must be won to add a bonus-game-modifier to the feature pool. Still further, bonus-game-modifiers can be linked or associated with base-game symbols of a certain type while other base-game symbols of a lesser or inferior type are not linked or associated with any bonus-game-modifier.

While particular embodiments and applications of the present disclosure have been illustrated and described, it is to be understood that this disclosure is not limited to the precise construction and compositions disclosed herein and that various modifications, changes, and variations can be apparent from the foregoing descriptions without departing from the spirit and scope of the disclosure as defined in the appended claims.

What is claimed is:

1. A method for conducting a wagering game on a gaming system, the wagering game including a base game and a bonus game, the gaming system including one or more processors for conducting the wagering game and one or more display devices for displaying aspects of the wagering game, the method comprising:

conducting a plurality of base games via at least one of the one or more processors;

displaying, via at least one of the one or more display devices, a randomly determined outcome for each of the conducted base games;

displaying, via at least one of the one or more display devices, a feature pool comprising a plurality of storage fields each configured to display one or more items;

for each and every one of the conducted base games, removing one or more old items from and adding one or more new items to the storage fields of the feature pool displayed via at least one of the one or more display devices, the added one or more new items being either at least one randomly determined type of bonus-game-modifier, in response to a predetermined event occurring in the randomly determined outcome in the respective base game, or a non-modifier, in response to an absence of the predetermined event in the randomly determined outcome in the respective base game; and in response to a triggering event, conducting the bonus game modified by a plurality of the randomly determined types of bonus-game-modifiers displayed in the feature pool.

2. The method of claim 1, wherein the conducting the bonus game includes displaying a plurality of symbol-bearing bonus reels via at least one of the one or more display devices, varying the bonus reels to display randomly selected symbols from the bonus reels at respective symbol positions, and awarding an award based on an evaluation of the randomly selected symbols, and wherein the at least one randomly determined bonus-game-modifier is randomly selected from a group comprising: modifying one or more of the symbols, modifying a function of one or more of the symbols, modifying a function of one or more of the symbol positions, modifying how the randomly selected symbols are evaluated, and modifying the award.

3. The method of claim 1, wherein the conducting the base games includes displaying a plurality of symbol-bearing base game reels via at least one of the one or more display devices, varying the base game reels to display randomly selected symbols from the base game reels at respective symbol positions, and awarding an award based on an evaluation of the randomly selected symbols.

4. The method of claim 1, wherein the predetermined event is a winning outcome in the respective base game.

5. The method of claim 1, wherein the triggering event is a start-bonus outcome during any of the base games.

6. The method of claim 1, wherein the triggering event is either a start-bonus outcome in any of the base games or the predetermined event occurring in each of a predetermined number of the base games.

7. The method of claim 1, wherein the plurality of base games is conducted in series.

8. A method for conducting a wagering game on a gaming system, the wagering game including a base game and a bonus game, the gaming system including one or more processors for conducting the wagering game and one or more display devices for displaying aspects of the wagering game, the method comprising:

conducting a plurality of base games via at least one of the one or more processors;

displaying, via at least one of the one or more display devices, a feature pool comprising a plurality of storage fields each configured to display one or more items;

for each and every one of the conducted base games, removing one or more old items from and adding one or more new items to the storage fields of the feature pool displayed via at least one of the one or more display devices, the added one or more new items being either at least one randomly determined bonus-game-modifier, in response to a predetermined event occurring in a randomly determined outcome in the respective base game, or a non-modifier, in response to an absence of the predetermined event in the randomly determined outcome in the respective base game; and in response to a triggering event, conducting the bonus game modified by a plurality of the randomly determined bonus-game-modifiers in the feature pool, wherein the plurality of base games is conducted in parallel.

9. A method for conducting a wagering game on a gaming system, the wagering game including a base game and a bonus game, the gaming system including one or more processors for conducting the wagering game and one or more display devices for displaying aspects of the wagering game, the method comprising:

conducting a plurality of base games via at least one of the one or more processors;

for each of the conducted base games, adding at least one randomly determined bonus-game-modifier to a feature pool displayed via at least one of the one or more display devices in response to a predetermined event occurring in a randomly determined outcome in the respective base game; and in response to a triggering event, conducting the bonus game modified by a plurality of the randomly determined bonus-game-modifiers in the feature pool, wherein the feature pool includes a first-in first-out queue displayed via the at least one of the one or more display devices, the first-in first-out queue comprising a plurality of storage fields each configured to display one or more items, and wherein, for each of the conducted base games, one or more old items are removed from the storage fields of the queue and one or more new items are added to the storage fields of the queue, the added one or more new items being either the at least one randomly determined bonus-game-modifier in response to the predetermined event or a non-modifier in the absence of the predetermined event.

10. A gaming system for conducting a wagering game, the wagering game including a base game and a bonus game, the gaming system comprising:

one or more display devices configured to display the wagering game; and one or more processors configured to:

conduct a plurality of base games;

direct at least one of the one or more display devices to display a randomly determined outcome for each of the conducted base games;

direct at least one of the one or more display devices to display a feature pool comprising a plurality of storage fields each configured to display one or more items;

for each and every one of the conducted base games, remove one or more old items from and add one or more new items to the storage fields of the feature pool displayed via at least one of the one or more display devices, the added one or more new items being either at least one randomly determined type of bonus-game-modifier, in response to a predetermined event occurring in the randomly determined outcome in the respective base game, or a non-modifier, in response to an absence of the predetermined event in the randomly determined outcome in the respective base game; and in response to a triggering event, conduct the bonus game modified by a plurality of the randomly determined types of bonus-game-modifiers displayed in the feature pool.

11. A gaming system for conducting a wagering game, the wagering game including a base game and a bonus game, the gaming system comprising:

one or more display devices configured to display the wagering game; and one or more processors configured to:

conduct a plurality of base games, wherein the plurality of base games is conducted in parallel;

direct at least one of the one or more display devices to display a feature pool comprising a plurality of storage fields each configured to display one or more items;

for each and every one of the conducted base games, remove one or more old items from and add one or more new items to the storage fields of the feature pool, the added one or more new items being either a randomly determined bonus-game-modifier, in response to a predetermined event occurring in a randomly determined outcome in the respective base game, or a non-modifier, in response to the absence of the predetermined event in the randomly determined outcome in the respective base game; and in response to a triggering event, conduct the bonus game modified by a plurality of the randomly determined bonus-game-modifiers in the feature pool.

12. The system of claim 10, wherein, in conducting the bonus game, at least one of the one or more display devices is configured to display a plurality of symbol-bearing bonus reels, and vary the bonus reels to display randomly selected symbols from the bonus reels at respective symbol positions, and at least one of the one or more processors is configured to award an award based on an evaluation of the randomly selected symbols, and wherein the at least one randomly determined bonus-game-modifier is randomly selected from a group comprising: modifying one or more of the symbols, modifying a function of one or more of the symbols, modifying a function of one or more of the symbol positions, modifying how the randomly selected symbols are evaluated, and modifying the award.

13. The system of claim 10, wherein, in conducting each of the base games, at least one of the one or more display devices is configured to display a plurality of symbol-bearing base game reels, and vary the base game reels to display randomly selected symbols from the base game reels at respective symbol positions, and at least one of the one or more processors is configured to award an award based on an evaluation of the randomly selected symbols.

14. The system of claim 10, wherein the predetermined event is a winning outcome in the respective base game.

15. The system of claim 10, wherein the triggering event is a start-bonus outcome during any of the plurality of base games.

16. The system of claim 10, wherein the triggering event is either a start-bonus outcome in any of the base games or the predetermined event occurring in each of a predetermined number of the base games.

17. The system of claim 10, wherein the plurality of base games is conducted in series.

18. A gaming system for conducting a wagering game, the wagering game including a base game and a bonus game, the gaming system comprising:

one or more display devices configured to display the wagering game; and one or more processors configured to:

conduct a plurality of base games;

for each of the conducted base games, add at least one randomly determined bonus-game-modifier to a feature pool in response to a predetermined event occurring in a randomly determined outcome in the respective base game; and in response to a triggering event, conduct the bonus game modified by a plurality of the randomly determined bonus-game-modifiers in the feature pool, wherein the feature pool includes a first-in first-out queue displayed via the at least one of the one or more display devices, the first-in first-out queue comprising a plurality of storage fields each configured to display one or more items, and wherein, for each of the conducted base games, one or more old items are removed from the storage fields of the queue and one or more new items are added to the storage fields of the queue, the added one or more new items being either the at least one randomly determined bonus-game-modifier in response to the predetermined event or a non-modifier in the absence of the predetermined event.

19. One or more non-transitory machine-readable storage media including instructions which, when executed by one or more processors, cause the one or more processors to perform operations associated with a wagering game, the wagering game including a base game and a bonus game, the operations comprising:

conducting a plurality of base games;

directing at least one display device to display a randomly determined outcome for each of the conducted base games;

directing at least one display device to display a feature pool comprising a plurality of storage fields each configured to display one or more items;

for each and every one of the conducted base games, removing one or more old items from and adding one or more new items to the storage fields of the feature pool displayed via the at least one display device, the added one or more new items being either at least one randomly determined type of bonus-game-modifier, in response to a predetermined event occurring in the randomly determined outcome in the respective base game, or a non-modifier, in response to an absence of the predetermined event in the randomly determined outcome in the respective base game; and in response to a triggering event, conducting the bonus game modified by a plurality of the randomly determined types of bonus-game-modifiers displayed in the feature pool.

20. One or more non-transitory machine-readable storage media including instructions which, when executed by one or more processors, cause the one or more processors to perform operations associated with a wagering game, the wagering game including a base game and a bonus game, the operations comprising:

conducting a plurality of base games;

directing at least one display device to display a feature pool comprising a plurality of storage fields each configured to display one or more items;

for each and every one of the conducted base games, removing one or more old items from and adding one or more new items to the storage fields of the feature pool, the added one or more new items being either a randomly determined bonus-game-modifier, in response to a predetermined event occurring in a randomly determined outcome in the respective base game, or a non-modifier, in response to an absence of the predetermined event in the randomly determined outcome in the respective base game; and in response to a triggering event, conducting the bonus game modified by a plurality of the randomly determined bonus-game-modifiers in the feature pool, wherein the plurality of base games is conducted in parallel.

21. The machine-readable media of claim 19, wherein the operation of conducting the bonus game includes displaying via at least one display device a plurality of symbol-bearing bonus reels, varying the bonus reels to display randomly selected symbols from the bonus reels at respective symbol positions, and awarding an award based on an evaluation of the randomly selected symbols, and wherein the at least one randomly determined bonus-game-modifier is randomly selected from a group comprising: modifying one or more of the symbols, modifying a function of one or more of the symbols, modifying a function of one or more of the symbol positions, modifying how the randomly selected symbols are evaluated, and modifying the award.

22. The machine-readable media of claim 19, wherein the operation of conducting the base games includes displaying via at least one display device a plurality of symbol-bearing base game reels, varying the base game reels to display randomly selected symbols from the base game reels at respective symbol positions, and awarding an award based on an evaluation of the randomly selected symbols.

23. The machine-readable media of claim 19, wherein the predetermined event is a winning outcome in the respective base game.

24. The machine-readable media of claim 19, wherein the triggering event is a start-bonus outcome during any of the base games.

25. The machine-readable media of claim 19, wherein the triggering event is either a start-bonus outcome in any of the base games or the predetermined event occurring in each of a predetermined number of the base games.

26. The machine-readable media of claim 19, wherein the plurality of base games is conducted in series.

27. One or more non-transitory machine-readable storage media including instructions which, when executed by one or more processors, cause the one or more processors to perform operations associated with a wagering game, the wagering game including a base game and a bonus game, the operations comprising:

conducting a plurality of base games;

for each of the conducted base games, adding at least one randomly determined bonus-game-modifier to a feature pool in response to a predetermined event occurring in a randomly determined outcome in the respective base game; and in response to a triggering event, conducting the bonus game modified by a plurality of the randomly determined bonus-game-modifiers in the feature pool, wherein the feature pool includes a first-in first-out queue displayed via at least one display device, the first-in first-out queue comprising a plurality of storage fields each configured to display one or more items, and wherein, for each of the conducted base games, one or more old items are removed from the storage fields of the queue and one or more new items are added to the storage fields of the queue, the added one or more new items being either the at least one randomly determined bonus-game-modifier in response to the predetermined event or a non-modifier in the absence of the predetermined event.

* * * * *